United States Patent [19]

Haruta

[11] Patent Number: 5,653,788
[45] Date of Patent: Aug. 5, 1997

[54] CANISTER FOR AN EVAPORATED FUEL PROCESSING DEVICE OF AN AUTOMOBILE

[75] Inventor: Kazumi Haruta, Ohbu, Japan

[73] Assignee: Aisan Kogyo Kabushiki Kaisha, Ohbu, Japan

[21] Appl. No.: 699,187

[22] Filed: Aug. 19, 1996

Related U.S. Application Data

[63] Continuation of Ser. No. 554,467, Nov. 7, 1995, abandoned, which is a continuation of Ser. No. 207,689, Mar. 9, 1994, abandoned.

[30] Foreign Application Priority Data

Mar. 25, 1993 [JP] Japan .................................. 5-065794

[51] Int. Cl.⁶ .................................................. B01D 53/02
[52] U.S. Cl. ..................... 96/144; 95/146; 96/147; 123/519
[58] Field of Search ................ 95/146, 148; 96/130, 96/134, 140, 141, 142, 143, 144, 147, 152, 385.3; 128/519; 55/DIG. 5

[56] References Cited

U.S. PATENT DOCUMENTS

| 3,831,353 | 8/1974 | Toth | 96/144 |
| 4,058,380 | 11/1977 | King, II | 123/519 |
| 4,318,383 | 3/1982 | Iritani et al. | 96/144 |
| 4,703,736 | 11/1987 | Atkins, Sr. | 96/144 |
| 4,714,485 | 12/1987 | Covert et al. | 96/143 |
| 4,750,465 | 6/1988 | Rediker, Jr. et al. | 96/144 |
| 4,986,840 | 1/1991 | Mori et al. | 96/144 |
| 5,119,791 | 6/1992 | Gifford et al. | 96/144 |
| 5,173,095 | 12/1992 | Yasukawa et al. | 96/144 |
| 5,304,235 | 4/1994 | Watanabe et al. | 96/144 |

FOREIGN PATENT DOCUMENTS

| 60-159873 | 10/1985 | Japan . | |
| 60-159874 | 10/1985 | Japan . | |
| 62-165568 | 7/1987 | Japan | 96/144 |
| 64-46462 | 3/1989 | Japan . | |
| 64-66461 | 3/1989 | Japan . | |
| 55149622 | 11/1990 | Japan . | |
| 5-202818 | 8/1993 | Japan . | |
| 6-280692 | 10/1994 | Japan | 123/519 |
| WO94/03719 | 2/1994 | WIPO | 123/519 |

*Primary Examiner*—Jay H. Woo
*Assistant Examiner*—Duane S. Smith
*Attorney, Agent, or Firm*—Cushman, Darby & Cushman IP Group of Pillsbury Madison & Sutro LLP

[57] ABSTRACT

A canister in which a supplying conduit is disposed at a position to penetrate through layers of an absorbent, includes a casing made of resin which includes a peripheral wall and a bottom integrally formed on the lower surface of the peripheral wall, and is opened at the top, a conduit support portion formed on the inner surface of the bottom, the supplying conduit secured in the conduit support portion and extended upright, and a top cover made of resin which is welded on an upper end portion of the casing. A purge port is attached to the top cover and has a recess into which the supplying conduit is inserted. The supplying conduit is dimensioned so that it creates a circumferential gap between the recess and the upper portion of the supplying conduit.

3 Claims, 5 Drawing Sheets

CANISTER FOR AN EVAPORATED FUEL PROCESSING DEVICE OF AN AUTOMOBILE

This is a continuation of application Ser. No. 08/554,467, filed on Nov. 7, 1995, which was abandoned upon filing hereof which in turn was a continuation of application Ser. No. 08/207,689, filed on Mar. 9, 1994, now abandoned.

BACKGROUND OF THE INVENTION

The present invention relates to a canister used for an evaporated fuel processing device of an automobile.

Conventionally, in a canister made of resin which contains an absorbent of evaporated fuel which is composed of activated carbon, as shown in FIG. 7C, a peripheral wall 1 is integrally formed with a top wall 2, and a bottom cover 3 is fixed on a lower portion of the peripheral wall 1 by friction welding, spin welding or the like, thereby constituting a casing of the canister. (For example, Japanese Utility Model Unexamined Publication No. 60-159873.)

In this manner, the bottom cover 3 is securely welded on the lower end surface of the peripheral wall 1 which forms the casing, and consequently, welded portions 4 are located at lower portions of the casing for the following reason.

For example, as shown in FIG. 8, a peripheral wall 1 of a casing is integrally formed with a bottom wall 3, and after filling an absorbent 5 in the casing opened at the top, a top cover 6 is attached to the casing, so that welded portions can be located at upper portions of the casing. However, it is difficult to penetrate a supplying conduit 7 through layers of the absorbent 5 filled in the casing.

Therefore, a casing integrally formed with a top wall 2 and opened at the bottom is turned upside down, as shown in FIG. 7A, to have a posture vertically reverse to a posture for use, and a supplying conduit 7 provided on the top wall 2 is extended upright in the casing. An absorbent 5 is filled in the casing from a top opening 1a, and a bottom cover 3 is thereafter welded securely on the casing, as shown in FIG. 7B. Then, the casing is turned upside down to have the posture for use, as shown in FIG. 7C.

As a result, welded portions 4 are located at lower portions of the casing in the posture for use.

With the casing including the bottom cover 3 welded thereon and the welded portions 4 located at the lower portions of the casing, as described above, the welded portions 4 having the lowest strength are sometimes separated at the time of a collision of the automobile, so that the bottom cover 3 will be opened or come off, and that all the absorbent 5 will drop out of the casing.

In such a case, if the absorbent 5 scatters in an engine room, various problems arise because evaporated fuel is absorbed in the absorbent 5.

SUMMARY OF THE INVENTION

It is therefore an object of the present invention to provide a canister which can be easily filled with an absorbent and which can also solve the above-described problem.

In order to solve the foregoing problem, the present invention provides a canister characterized in that it has a casing made of resin which includes a peripheral wall and a bottom integrally formed on the lower surface of the peripheral wall, and is opened at the top, a conduit support portion is formed on the inner surface of the bottom, a supplying conduit is secured in the conduit support portion and extended upright, and a top cover made of resin is welded on an upper end portion of the casing.

In order to perform the assembly of the canister, the supplying conduit is extended upright by fixing the supplying conduit in the conduit support portion of the bottom, with the top cover being removed, and an absorbent is filled in the casing from the upper end opening. After that, the top cover is welded on an upper end portion of the casing.

Thus, filling of the absorbent can be easily carried out, and also, the supplying conduit can be readily provided at such a position to penetrate through the layers of the absorbent. Consequently, the casing need not be turned upside down at the time of the assembly as in the conventional example.

Moreover, since the top cover is welded on the casing, the welded portions are located at the upper portions of the casing. Therefore, if the welded portions having the lowest strength are separated at the time of a collision of the vehicle, the top cover will be detached partially or come off. When the casing is in such a damaged state, the absorbent carrying evaporated fuel in the casing will not scatter into the engine room outside of the casing.

DETAILED DESCRIPTION OF THE PREFERRED EMBODIMENTS

One embodiment according to the present invention will be hereinafter described with reference to FIGS. 1 to 6.

Figure 1:
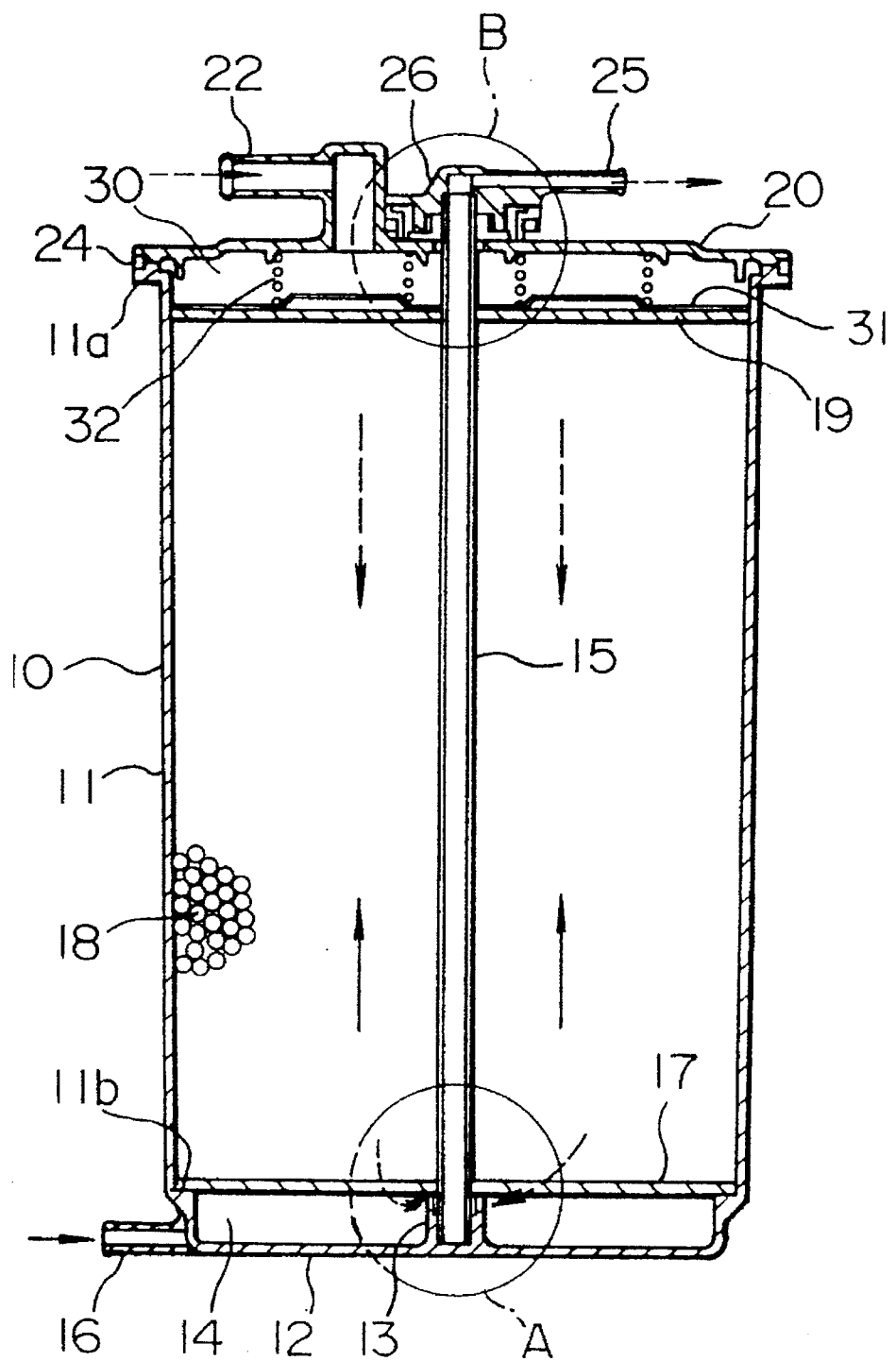
FIG. 1 is a vertical cross-sectional view showing one embodiment according to the present invention.
Figure 2:
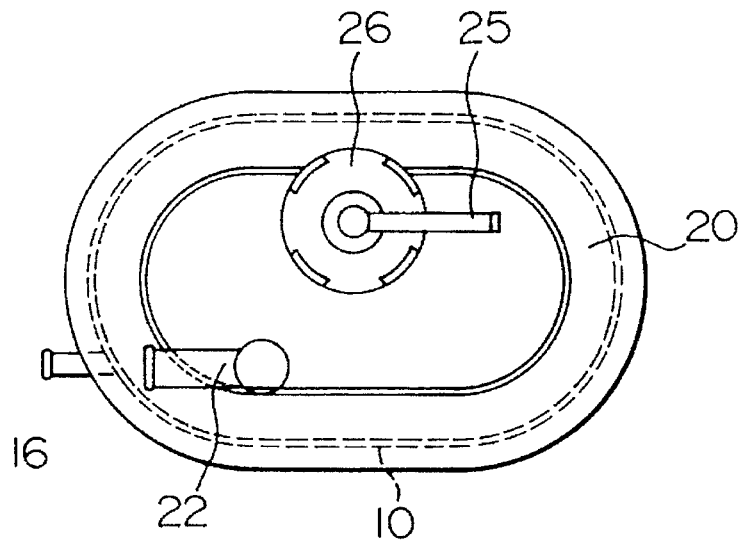
FIG. 2 is a plan view showing the same.

As shown in FIG. 1, a canister casing 10 made of a synthetic resin has a bottomed cylindrical shape which is opened at the upper end, and includes a peripheral wall 11 and a bottom portion 12 which are integrally formed with each other. A flange portion 11a for welding is formed on the upper end of the peripheral wall 11. A conduit support portion 13 is integrally formed on the inner surface of the bottom portion 12.

Figure 3:
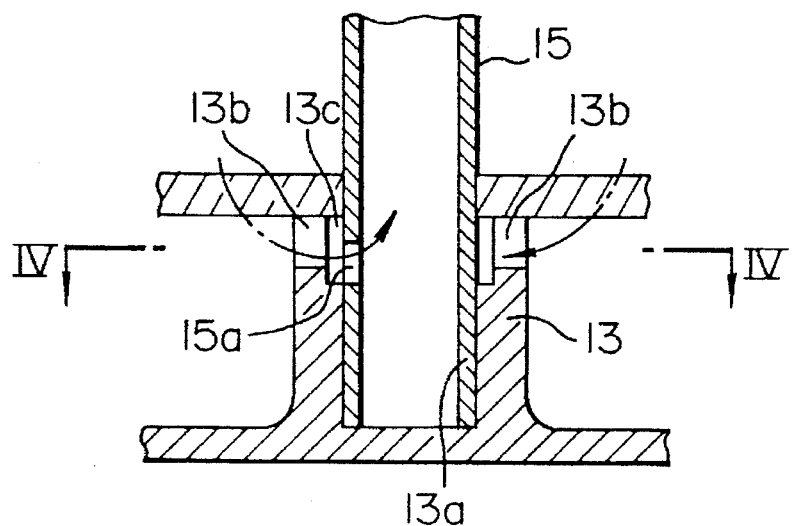
FIG. 3 is an enlarged, vertical cross-sectional view showing the portion A in FIG. 1.
Figure 4:
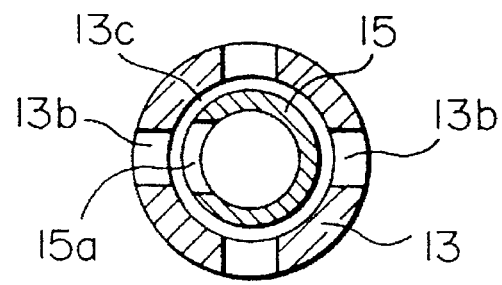
FIG. 4 is a cross-sectional view taken along the line IV—IV in FIG. 3.

As shown in FIG. 3, the conduit support portion 13 is formed in a bottomed cylindrical shape including a support hole 13a which is opened at the top. The height of the conduit support portion 13 is substantially the same as the height of a dispersion chamber 14 formed in an inner bottom portion of the casing 10.

A plurality of slits 13b are formed, in the circumferential direction, in an upper portion of the peripheral wall of the conduit support portion 13, and penetrated all through. Also, a communicating space 13c in the form of an annular recess which communicates the dispersion chamber 14 with a supplying conduit 15 which will be described below, is formed in the inner peripheral surface including the slits 13b.

The supplying conduit 15 has a lower end portion press-fitted in the support hole 13a of the conduit support portion 13 and is extended upright in the casing 10. The supplying conduit 15 is designed to have such a height as to penetrate through and project upwardly from a top cover 20 which will be described later.

A purge hole 15a is formed in that portion of the supplying conduit 15 where it is closely fitted in the conduit support portion 13, so as to communicate with the slits 13b.

As shown in FIG. 1, a tank port 16 is provided on the peripheral wall of the dispersion chamber 14, and communicates with the dispersion chamber 14 at an inner end thereof and communicates with a fuel tank at an outer end thereof.

A lower filter 17 is fitted around the supplying conduit 15 and sustained by the upper surface of the conduit support portion 13 and a stepped portion 11b formed on the peripheral wall 11.

An absorbent 18 composed of activated carbon is filled in a container space which is defined by the inner peripheral surface of the peripheral wall 11, the outer peripheral surface of the supplying conduit 15 and the lower filter 17.

An upper filter 19 is fitted around the supplying conduit 15 and disposed on layers of the absorbent 18.

Figure 5:
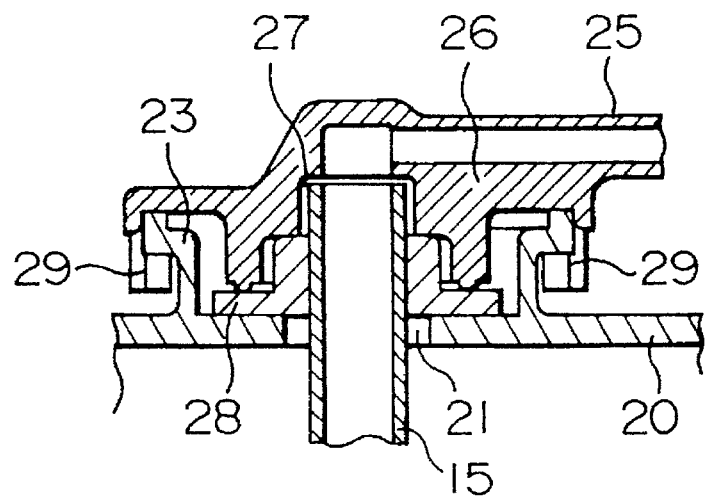
FIG. 5 is an enlarged, vertical cross-sectional view showing the portion B in FIG. 1.

As shown in FIG. 5, the top cover 20 made of a synthetic resin includes a hole 21 through which the supplying conduit 15 penetrates. Also, an atmospheric air port 22 and a retainer portion 23 are integrally formed on the top cover 20.

The peripheral edge of the top cover 20 is secured on the upper end surface of the peripheral wall 11 of the casing 10 by friction welding, spin welding or the like. Reference numeral 24 denotes a portion where this welding takes place.

As shown in FIG. 5, a base portion 26 of a purge port 25 made of a synthetic resin has a recess 27 formed in the lower surface thereof, and the upper end portion of the supplying conduit 15 is closely fitted in the recess 27 where a flow passage of the supplying conduit 15 communicates with a flow passage of the purge port 25.

A rubber packing member 28 is compressed and interposed between the top cover 20 and the lower surface of the base portion 26 so as to prevent leakage of gas from the portion where the supplying conduit 15 is communicated with the purge port 25.

Elastic claws 29 project in an L-shape from the outer periphery of the base portion 26. When the claws 29 are pressed on the retainer portion 23, the claws 29 are elastically engaged with the lower surface of the retainer portion 23, thereby securing the base portion 26 on the top cover 20.

In FIG. 1, reference numeral 30 denotes an atmospheric air chamber, 31 a pressure plate, and 32 a spring.

Next, the assembly process will be described.

Figure 6:
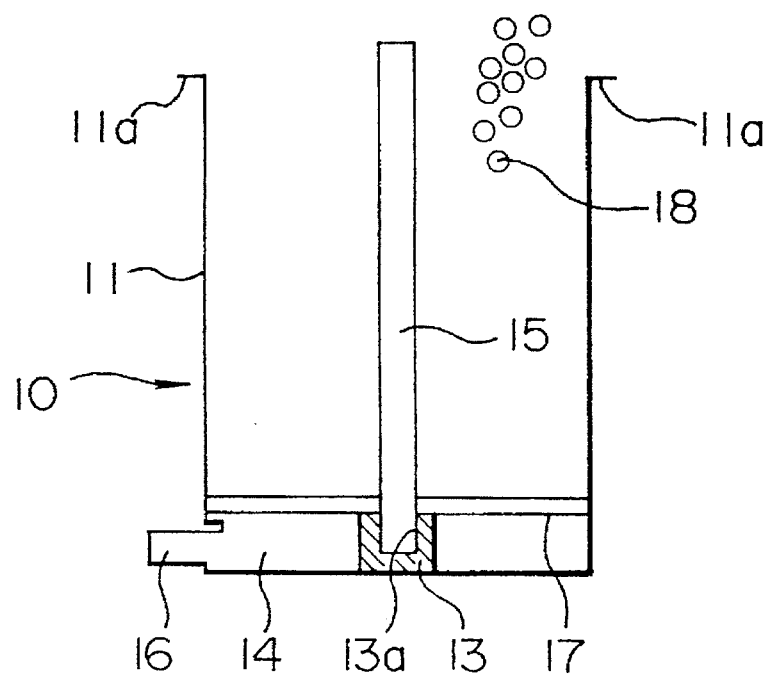
FIG. 6 is a simplified cross-sectional view showing a filling operation of an absorbent in the embodiment according to the invention.
Figure 7A:
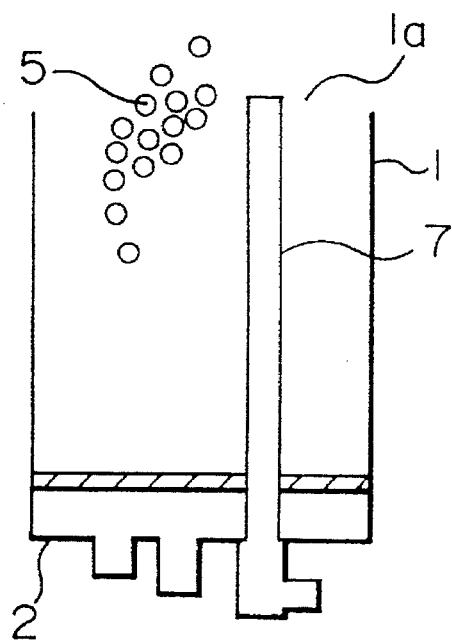
FIGS. 7A, 7B and 7C are simplified cross-sectional views showing a filling operation of an absorbent in a prior art conventional structure.
Figure 7B:
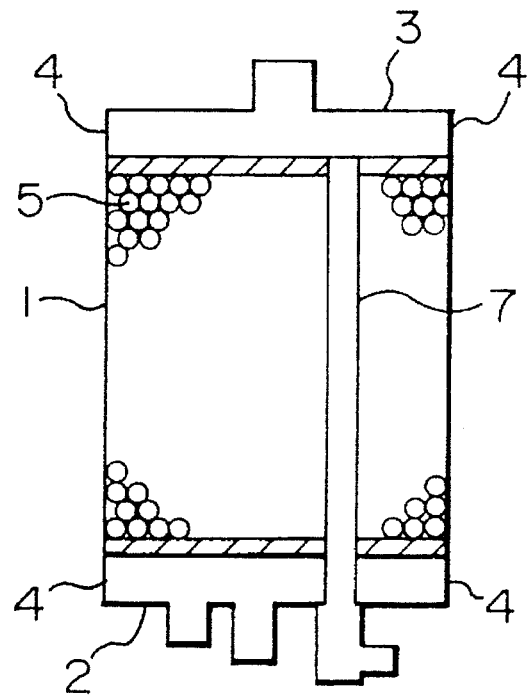
Figure 7C:
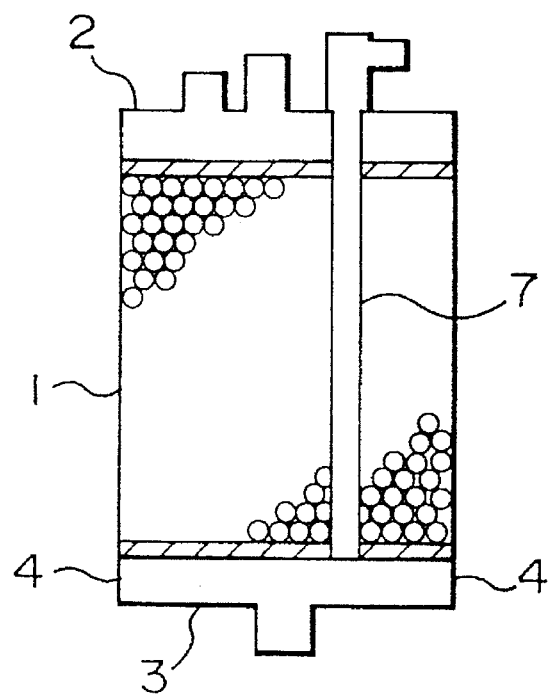
Figure 8:
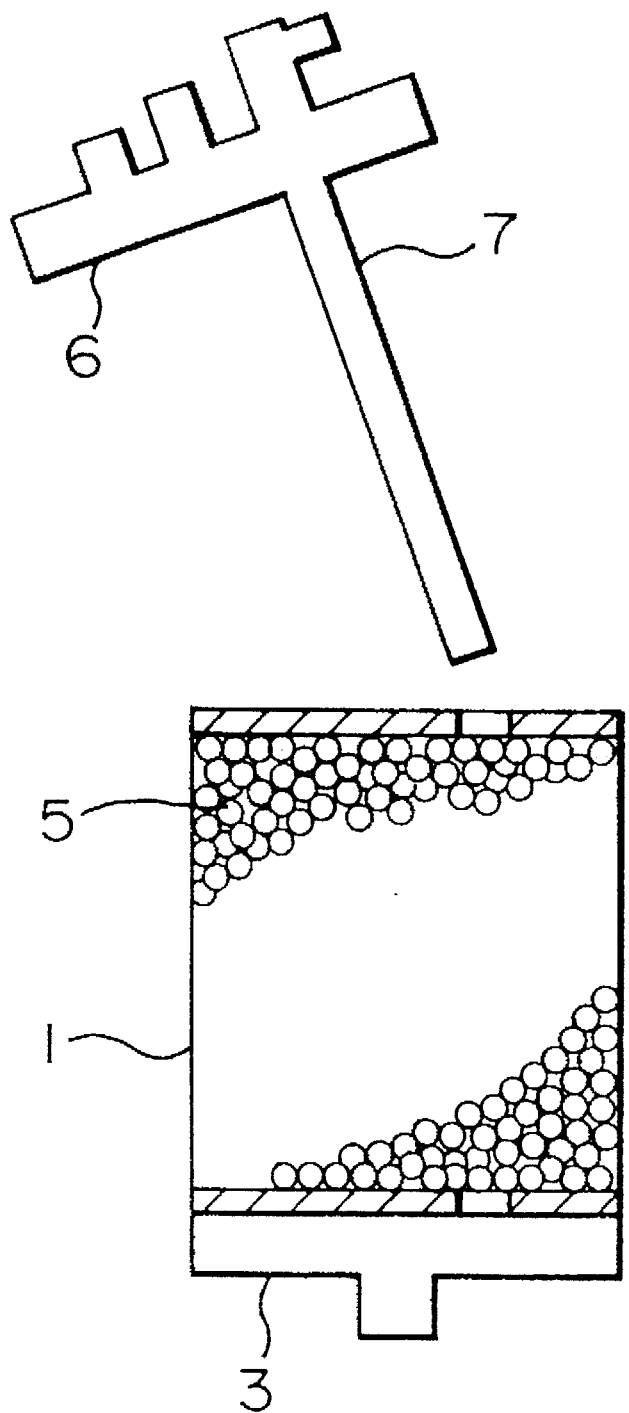
FIG. 8 is a simplified cross-sectional view showing another operation in the prior art conventional structure.

First, as shown in FIG. 6, the casing 10 without the top cover 20 is placed in such a posture that the top is opened. The supplying conduit 15 is extended upright and fixed by press-fitting the lower end of the supplying conduit 15 in the support hole 13a of the conduit support portion 13, and also, the lower filter 17 is set in the casing 10.

In this state, a predetermined amount of the absorbent 18 is filled in the casing 10.

The upper filter 19 and the pressure plate 31 are closely fitted in the casing 10, as shown in FIG. 1. After that, the top cover 20 is placed over the flange portion 11a formed on the upper end of the peripheral wall 11 of the casing 10, with the spring 32 interposed between the top cover 20 and the pressure plate 31. At this time, the upper portion of the supplying conduit 15 is penetrated through these component parts.

Then, the flange portion 11a and the peripheral edge of the top cover 20 are fixed by friction welding, spin welding or the like.

The rubber packing member 28 is closely fitted on the upper end portion of the supplying conduit 15 which projects from the top cover 20, and the base portion 26 of the purge port 25 is placed over the packing member 28.

Thereafter, the claws 29 formed on the outer periphery of the base portion 26 are pressed downwardly and engaged elastically with the retainer portion 23 of the top cover 20.

Thus, the assembly is completed.

When the canister thus assembled is mounted on an automobile, evaporated fuel generated from the fuel tank is introduced into the canister by way of the tank port 16, dispersed in the dispersion chamber 14, moved upwardly through the layers of the absorbent 18, as indicated by the arrows of solid lines in FIG. 1, and absorbed by the absorbent 18.

By driving the engine, a negative pressure in the suction pipe is applied to the purge port 25. Then, the atmospheric air is introduced into the canister via the atmospheric air port 22 and flows downwardly through the layers of the absorbent 18, as indicated by the arrows of dashed lines in FIG. 1.

The evaporated fuel which has been absorbed by the absorbent 18 is separated by this flow of the atmospheric air and flows into the dispersion chamber 14 with the atmospheric air. Then, the evaporated fuel is introduced into the supplying conduit 15 by way of the slits 13b of the conduit support portion 13 and the purge hole 15a, flows upwardly in the supplying conduit 15, and is discharged into the suction passage of the engine via the purge port 25.

According to the present invention, as described heretofore, the canister having the supplying conduit which penetrates through the layers of the absorbent can be filled with the absorbent from the top when the casing thereof is in the posture for use, and therefore, the top cover can be welded on the casing after filling of the absorbent.

In consequence, the top cover is welded on the upper portions of the casing so that even if the welded portions having the lowest strength are separated at the time of a collision of the vehicle, it is possible to decrease, to the minimum, the amount of the absorbent carrying evaporated fuel in the casing which scatters into the engine room, or to prevent such scattering.

What is claimed is:

1. A canister comprising:

a casing, which is made of resin, comprising a peripheral wall and a bottom wall integrally formed on a lower portion of said peripheral wall;

a conduit support portion formed on an inner surface of said bottom wall;

a supplying conduit secured in said conduit support portion and extending substantially upright in said casing;

a top cover, which is made of resin, attached to an upper portion of said casing;

a purge port being fixedly mounted on said top cover and porting said supply conduit;

a packing member being mounted substantially between said top cover and said purge port;

a fuel vapor intake port opening into a lower portion of said casing; and said purge port defining a recess in which said supply conduit is inserted, said recess and said supply conduit being dimensioned so as to define a gap in a circumferential direction between said recess and an upper portion of said supplying conduit.

2. A canister according to claim 1 wherein said packing member seals between said supplying conduit and said purge port so as to prevent said supplying conduit from becoming loose due to vibration of said supplying conduit.

3. A canister comprising:

a casing, which is made of resin, comprising a peripheral wall and a bottom wall integrally formed on a lower portion of said peripheral wall;

a conduit support portion formed on an inner surface of said bottom wall;

a supplying conduit secured in said conduit support portion and extending substantially upright in said casing;

a lower filter supported by said conduit support portion and fitting inside said lower portion of said peripheral wall;

an upper filter fitting around said supplying conduit and inside an upper portion of said peripheral wall;

a fuel vapor intake port opening into said casing below said lower filter;

a top cover, which is made of resin, which is attached to an upper portion of said casing;

an atmospheric air port located in said top cover; and a purge port mounted on said top cover coincident with said supply conduit, said purge port defining a recess in which said supply conduit is inserted, said recess and said supply conduit being dimensioned so as to define a gap in a circumferential direction between said recess and an upper portion of said supplying conduit.

* * * * *